US008848670B2

(12) United States Patent
Jang

(10) Patent No.: US 8,848,670 B2
(45) Date of Patent: Sep. 30, 2014

(54) AUTHENTICATION SYSTEM AND AUTHENTICATION METHOD IN WIRELESS LAN ENVIRONMENT

(75) Inventor: Yong Sug Jang, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 13/695,574

(22) PCT Filed: Nov. 16, 2011

(86) PCT No.: PCT/KR2011/008738
§ 371 (c)(1),
(2), (4) Date: Oct. 31, 2012

(87) PCT Pub. No.: WO2012/070801
PCT Pub. Date: May 31, 2012

(65) Prior Publication Data
US 2013/0044733 A1 Feb. 21, 2013

(30) Foreign Application Priority Data
Nov. 25, 2010 (KR) .......... 10-2010-0118013

(51) Int. Cl.
H04W 80/04 (2009.01)
H04W 12/06 (2009.01)
H04W 36/00 (2009.01)
H04L 29/06 (2006.01)
H04W 88/08 (2009.01)
H04W 84/12 (2009.01)
H04W 24/04 (2009.01)

(52) U.S. Cl.
CPC .............. *H04W 12/06* (2013.01); *H04W 88/08* (2013.01); *H04W 84/12* (2013.01); *H04W 36/0038* (2013.01); *H04L 63/0876* (2013.01); *H04W 24/04* (2013.01)
USPC ............ 370/331; 370/348; 370/352; 455/436

(58) Field of Classification Search
CPC ...... H04W 80/04; H04W 36/14; H04W 84/12
USPC ........... 370/352, 331, 348; 455/436, 437, 439
See application file for complete search history.

(56) References Cited

U.S. PATENT DOCUMENTS

2005/0249176 A1* 11/2005 O'Neill et al. ................ 370/338
2005/0286489 A1* 12/2005 Shin et al. ..................... 370/352

(Continued)

FOREIGN PATENT DOCUMENTS

| CN | 1567868 A | 1/2005 |
| KR | 10-0494558 | 6/2005 |
| KR | 10-0545078 | 1/2006 |
| KR | 10-2009-0108469 | 10/2009 |
| KR | 10-2010-0057837 | 6/2010 |

OTHER PUBLICATIONS

International Search Report mailed Apr. 27, 2012 for PCT/KR2011/008738.

(Continued)

*Primary Examiner* — Thai Nguyen
*Assistant Examiner* — Hien Nguyen
(74) *Attorney, Agent, or Firm* — Lowe Hauptman & Ham, LLP

(57) ABSTRACT

The authentication system in the wireless LAN environment includes a first wireless LAN access point for providing a wireless LAN service to a terminal device accessing the first wireless LAN access point; the terminal device for transmitting an authentication request to a second wireless LAN access point when the terminal device moves to access the second wireless LAN access point while receiving the wireless LAN service through an access to the first wireless LAN access point; and the second wireless LAN access point for identifying the first wireless LAN access point based on identification information contained in the authentication request transmitted from the terminal device which has moved to access the second wireless LAN access point, acquiring authentication information on the terminal device from the identified first wireless LAN access point, and performing an authentication for the terminal device based on the acquired authentication information.

10 Claims, 4 Drawing Sheets

(56) References Cited

U.S. PATENT DOCUMENTS

| | | | |
|---|---|---|---|
| 2007/0177549 A1* | 8/2007 | Lo et al. | 370/331 |
| 2008/0165733 A1* | 7/2008 | Xiao et al. | 370/330 |
| 2009/0019284 A1* | 1/2009 | Cho et al. | 713/170 |

OTHER PUBLICATIONS

Chinese Office Action for application No. 201180031453.5 dated Apr. 3, 2014.

* cited by examiner

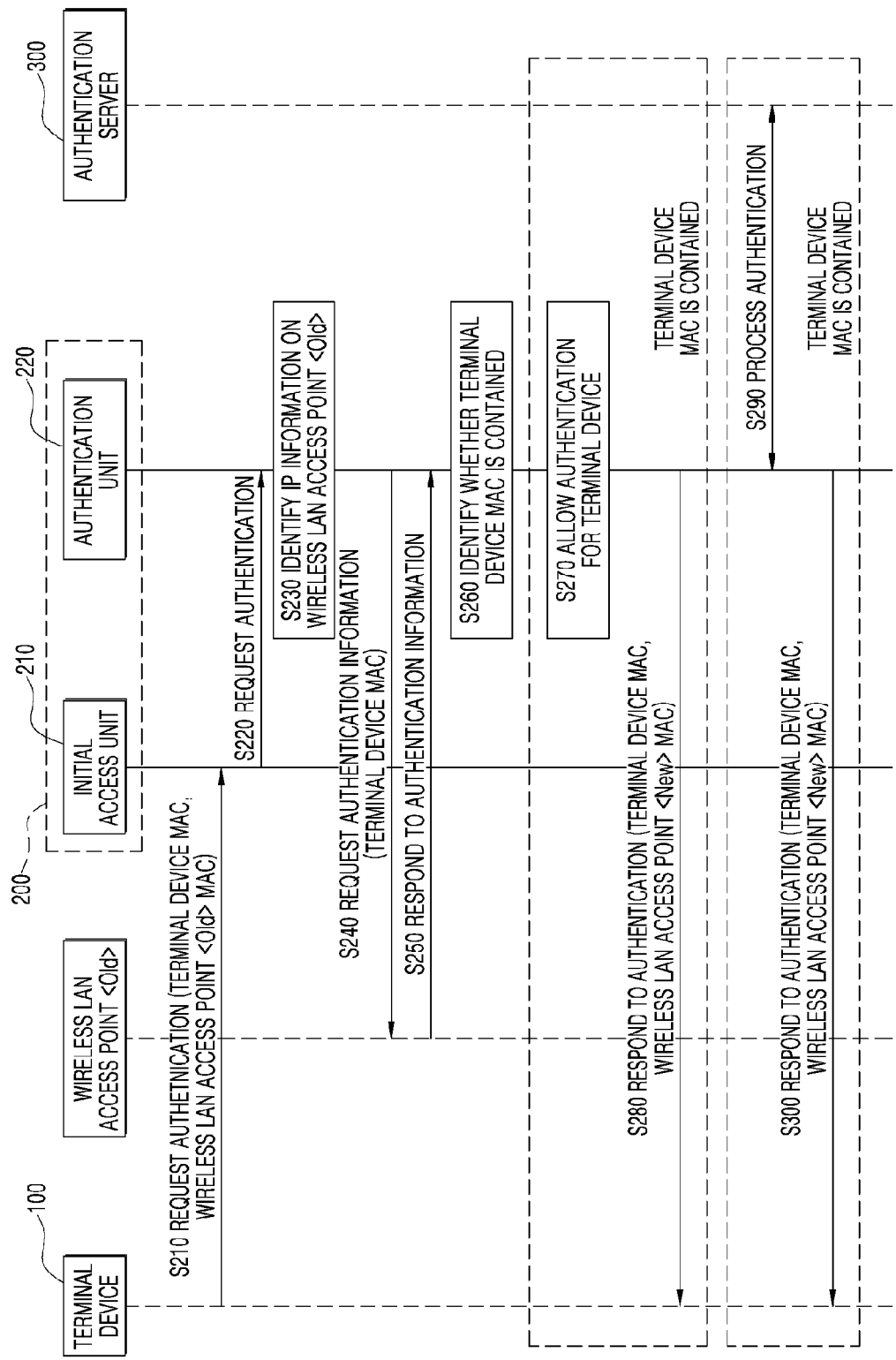

AUTHENTICATION SYSTEM AND AUTHENTICATION METHOD IN WIRELESS LAN ENVIRONMENT

CROSS REFERENCE TO RELATED APPLICATION

This application claims the priority of Korean Patent Application No. 10-2010-0118013, filed on Nov. 25, 2010 in the KIPO (Korean Intellectual Property Office). Further, this application is the National Phase application of International Application No. PCT/KR2011/008738 filed Nov. 16, 2011, which designates the United States and was published in Korean.

TECHNICAL FIELD

The present invention relates to an a method of authenticating a terminal device in a wireless LAN environment, and more particularly to an authentication system and an authentication method in a wireless LAN environment, in which, when a terminal device moves to access another wireless LAN access point while receiving a wireless LAN service using a wireless LAN access point, the another wireless LAN access point performs an authentication for the terminal device by interworking with the wireless LAN access point which the terminal device has previously accessed, a wireless LAN access apparatus, and a method of operating the wireless LAN access apparatus.

BACKGROUND

In current wireless LAN service, network access authentication is performed in such way that an MAC address list of a wireless LAN Access Point (AP) is registered in an authentication server managing all service subscribers instead of the wireless LAN access point, and the authentication service authenticates the MAC address transferred when a wireless terminal device accesses the network.

Meanwhile, since a wireless LAN service can be used by a smart phone and the like having an mobility as well as a notebook, it is required to provide a roaming service which can maintain an access when a user moves to another wireless LAN access point after accessing a wireless LAN access point. Further, in order to prevent an illegal use through a theft of user identification information, a simultaneous access for the same user identification information should not be allowed.

Accordingly, in order to provide the roaming service effectively, re-authentication procedure in the case of roaming should be performed considering prevention of the simultaneous access above described, and there should be no session interruption for seamless roaming service.

SUMMARY

In accordance with an aspect of the present invention, wireless LAN access point, to which the terminal device has moved to access while the terminal device receives the wireless LAN service, can perform an authentication for the terminal device through an interworking with a wireless LAN access which the terminal device has previously accessed, so that the continuity of a wireless LAN service can be guaranteed even when an authentication server do not perform.

In accordance with an aspect of the present invention, there is provided an authentication system in a wireless LAN environment comprising: a first wireless LAN access point configured to provide a wireless LAN service to a terminal device accessing the first wireless LAN access point; the terminal device configured to transmit an authentication request to a second wireless LAN access point when the terminal device moves to access the second wireless LAN access point while receiving the wireless LAN service through the first wireless LAN access point; and the second wireless LAN access point configured to identify the first wireless LAN access point based on identification information contained in the authentication request transmitted from the terminal device, acquire authentication information on the terminal device from the identified first wireless LAN access point, and perform an authentication for the terminal device based on the acquired authentication information.

In accordance with an aspect of the present invention, there is provided a wireless LAN access point comprising: an initial access unit configured to receive an authentication request from a terminal device which has moved for an access; and an authentication unit configured to identify another wireless LAN access point, which the terminal device has previously accessed, based on identification information contained in the authentication request, acquire authentication information from the identified another wireless LAN access point, and perform an authentication for the terminal device based on the acquired authentication information.

The initial access unit may be configured to receive the authentication request containing one or more of an MAC address of the terminal device and an MAC address of the another wireless LAN access point from the terminal device.

The authentication unit may be configured to identify IP information of the another wireless LAN access point based on the MAC address of the another wireless LAN access point contained in the authentication request, transfer the MAC address of the terminal device to the another wireless LAN access point based on the identified IP information for requesting the authentication information.

The authentication unit may be configured to approve the authentication for the terminal device when the authentication contains the MAC address of the terminal device.

The authentication unit may be configured to perform the authentication for the terminal device by interworking with an authentication server when the authentication information does not contain the MAC address of the terminal device.

In accordance with an aspect of the present invention, there is provided an authentication method in a wireless LAN environment comprising: providing a wireless LAN service to a terminal device accessing a first wireless LAN access point, by the first wireless LAN access point; requesting an authentication by transmitting an authentication request to a second wireless LAN access point when the terminal device moves to access the second wireless LAN access point while receiving the wireless LAN service through the first wireless LAN access point, by the terminal device; identifying the first wireless LAN access point based on identification information contained in the authentication request transmitted from the terminal device, by the second wireless LAN access point; acquiring authentication information on the terminal device from the identified first wireless LAN access point, by the second wireless LAN access point; and performing an authentication for the terminal device based on the acquired authentication information, by the second wireless LAN access point.

In accordance with an aspect of the present invention, there is provided a method of operating a wireless LAN access point comprising: receiving an authentication request from a terminal device; identifying another wireless LAN access point, which the terminal device has previously accessed, based on identification information contained in the authentication request and acquiring authentication information from the identified another wireless LAN access point; and performing an authentication for the terminal device based on the acquired authentication information.

The step of receiving the authentication request may comprise receiving the authentication request containing one or more of an MAC address of the terminal device and an MAC address of the another wireless LAN access point from the terminal device.

The step of acquiring the authentication information comprises: identifying IP information of the another wireless LAN access point based on the MAC address of the another wireless LAN access point contained in the authentication request; and requesting the authentication information by transmitting the MAC address of the terminal device to the another wireless LAN access point based on the identified IP information.

The step of processing the authentication may comprise approving the authentication for the terminal device when the authentication information contains the MAC address of the terminal device.

The step of processing the authentication may comprise performing the authentication for the terminal device by interworking with an authentication server when the authentication information does not contain the MAC address of the terminal device.

Advantageous Effects

According to the authentication system and method in the wireless LAN environment according to the present invention, when the terminal device moves to access another wireless LAN access point while receiving the wireless LAN service, the another wireless LAN access point performs an authentication for the terminal device through an interworking with a wireless LAN access point which the terminal device has previously accessed, which makes it possible to guarantee the continuity of the wireless LAN service even when an error is generated in the authentication server.

BRIEF DESCRIPTION OF THE DRAWINGS

FIG. 4 is a flowchart for schematically describing a method of operating a wireless LAN access point according to embodiments of the present invention.

DETAILED DESCRIPTION OF THE EXEMPLARY EMBODIMENTS

Hereinafter, an exemplary embodiment of the present invention will be described with reference to the accompanying drawings.

Figure 1:
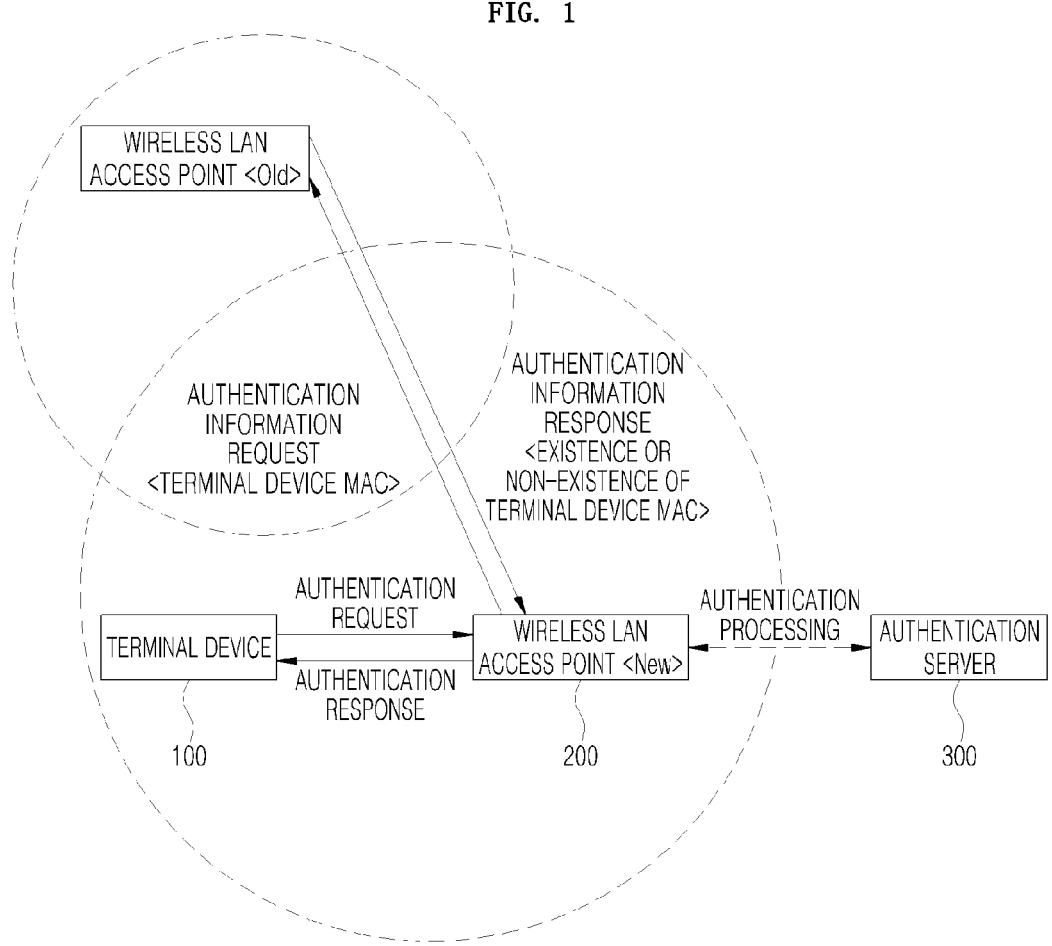
FIG. 1 is a diagram schematically illustrating an authentication system in a wireless LAN environment according to embodiments of the present invention.

FIG. 1 is a diagram schematically illustrating an authentication system in a wireless LAN environment according to embodiments of the present invention.

As shown in FIG. 1, the system includes a terminal device 100 which moves and accesses a wireless LAN access point while receiving a wireless LAN service, a wireless LAN access point 200 for processing authentication request received from the terminal device 100, and an authentication server 300 for processing authentication for the terminal device 100 through an interworking with the wireless LAN access point 200.

Here, the wireless LAN access point 200 refers to, for example, an AP (Access Point) for relaying the wireless LAN service provided to the terminal device 100 in a WiFi environment.

When the terminal device 100 moves and accesses the wireless LAN access point while receiving the wireless service, the terminal device 100 transmits an authentication request to the wireless LAN access point 200 to which the terminal device 100 has moved to access.

More specifically, when the terminal device 100 moves to access the wireless LAN access point 200 while receiving the wireless LAN service through a wireless LAN access point <Old> which the terminal device 100 has previously accessed, the terminal device 100 transmits the authentication request containing an MAC address of the terminal device 100 and an MAC address of the wireless LAN access point <Old>, which the terminal device 100 has previously accessed, to the wireless LAN access point 200, to which the terminal device 100 has moved to access.

The wireless LAN access point 200 acquires authentication information from the terminal device 100 based on the authentication request.

More specifically, the wireless LAN access point 200 identifies IP information of the wireless LAN access point <Old>, which the terminal device 100 has previously accessed, based on the MAC address of the wireless LAN access point <Old> contained in the authentication request received from the terminal device 200. Further, the wireless LAN access point 200 accesses the wireless LAN access point <Old> based on the identified IP information and transmits the MAC address of the terminal device 100 so that the authentication information is requested. Furthermore, the wireless LAN access point 200 acquires authentication information on the terminal device 100 mapped into the MAC address, which is included in authentication information response transmitted from the wireless LAN access point <Old> having received the authentication request.

Further, the wireless LAN access point 200 performs the authentication for the terminal device 100 based on the acquired authentication information.

More specifically, when the MAC address of the terminal device 100 is contained in the authentication information response received from the wireless LAN access point <Old>, the wireless LAN access point 200 approves the authentication for the terminal device 100 and transmits an authentication response, that is, the MAC address of the terminal device 100 and the MAC address of the wireless LAN access point 200 to the terminal device 100. Meanwhile, when the MAC address of the terminal device 100 is not contained in the authentication information response, the wireless LAN access point 200 performs a general authentication process through an interworking with the authentication server 300 and transmits the authentication response, that is, the MAC address of the terminal device 100 and the MAC address of the wireless LAN access point 200 to the terminal device 100.

Figure 2:
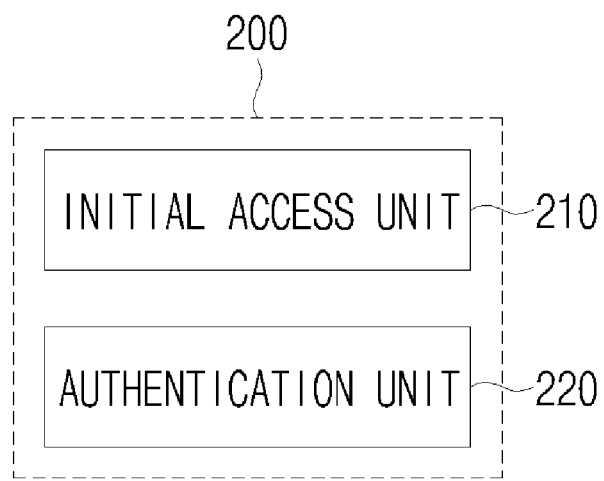
FIG. 2 is a diagram schematically illustrating a wireless LAN access point according to embodiments of the present invention.

Hereinafter, a more detailed construction of the wireless LAN access point 200 according to embodiments of the present invention will be described with reference to FIG. 2.

That is, the wireless LAN access point 200 includes an initial access unit 210 for receiving the authentication request from the terminal device 100 and an authentication unit 220 for performing an authentication processing for the authentication request.

The initial access unit 210 receives the authentication request from the terminal device 100 which has moved to change the access point.

More specifically, the initial access unit 210 receives the authentication request containing the MAC address of the terminal device 100 and the MAC address of the wireless LAN access point <Old>, which the terminal device 100 has previously accessed, from the terminal device 100 and transfers the received authentication request to the authentication unit 220.

The authentication unit 220 acquires authentication information from the terminal device 200 based on the authentication request.

More specifically, the authentication unit 220 identifies IP information of the wireless LAN access point <Old>, which the terminal device 100 has previously accessed, based on the MAC address of the wireless LAN access point <Old> contained in the transferred authentication request. Further, the authentication unit 220 accesses the wireless LAN access point <Old> based on the identified IP information and transfers the MAC address of the terminal device 100, so that the authentication information is requested. Furthermore, the authentication unit 220 acquires the authentication information of the terminal device 100 mapped into the MAC address, which is included in an authentication information response transferred from the wireless LAN access point <Old> having received the authentication request.

Further, the authentication unit 220 performs the authentication for the terminal device 100 based on the acquired authentication information.

More specifically, when the authentication information response transferred from the wireless LAN access point <Old> contains the MAC address of the terminal device 100, the authentication unit 220 allows the authentication for the terminal device 100 and transmits the authentication response, that is, the MAC address of the terminal device 100 and the MAC address of the wireless LAN access point 200 to the terminal device 100. Meanwhile, when the authentication information response does not contain the MAC address of the terminal device 100, the authentication unit 220 performs the general authentication processing through an interworking with the authentication server 300 and transmits the authentication response, that is, the MAC address of the terminal device 100 and the MAC address of the wireless LAN access point 200 to the terminal device 100.

As described above, based on the authentication system in the wireless LAN environment according to the embodiments of the present invention, when the terminal device 100, which receives the wireless LAN service, moves to access the wireless LAN access point 200, the wireless LAN access point 200 identifies the wireless LAN access point <Old>, which the terminal device 100 has previously accessed, based on the authentication request received from the terminal device 100 and performs the authentication for the terminal device 100 based on authentication information of the terminal device 100 pre-stored in the identified wireless LAN access point <Old>. As a result, even when the general authentication processing is not possible because of an error in the authentication server 300, the authentication for the terminal device 100 is performed through the interworking between wireless LAN access points so that the continuity of the wireless LAN service can be guaranteed.

Figure 3:
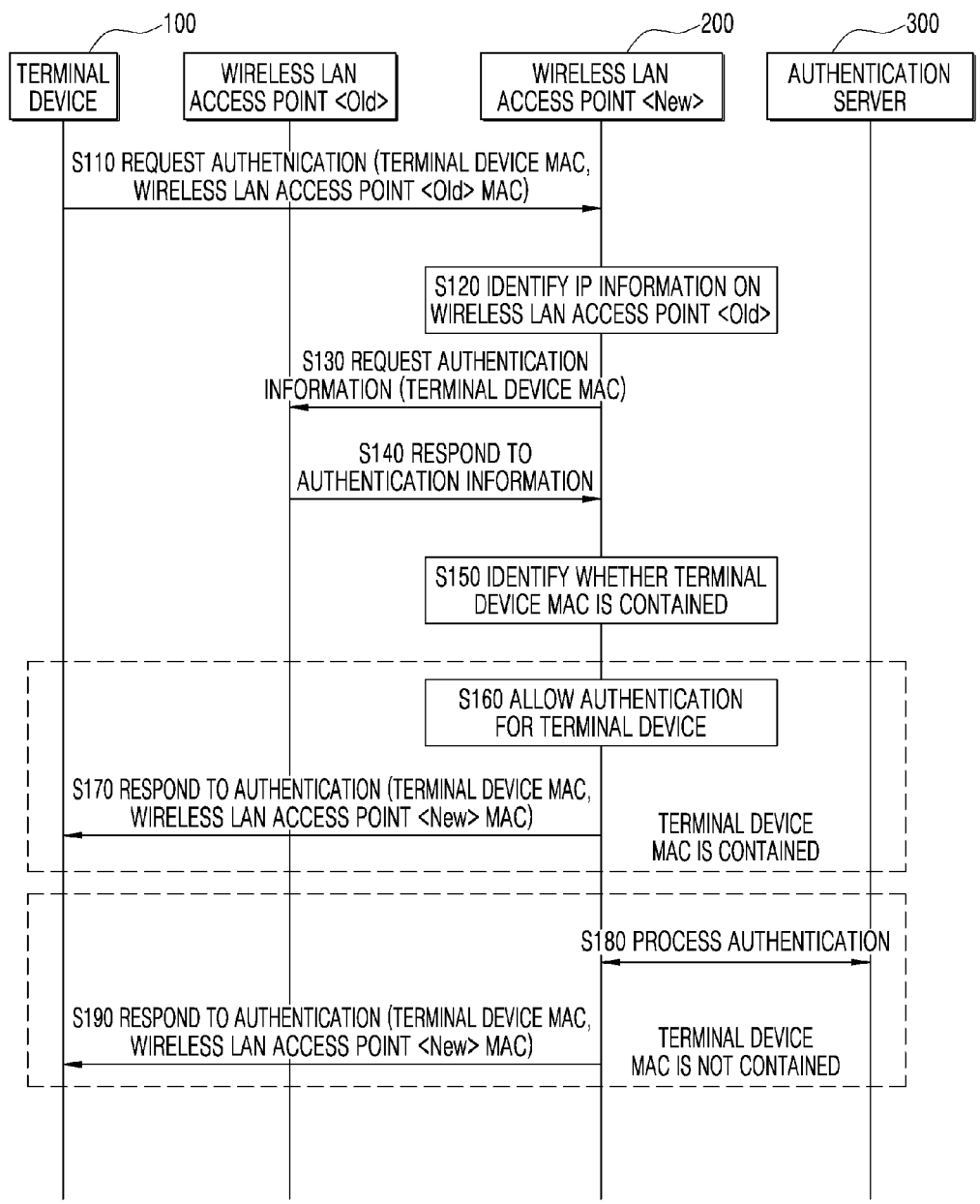
FIG. 3 is a flowchart for schematically describing a method of operating an authentication system in a wireless LAN environment according to embodiments of the present invention.

Hereinafter, an authentication method in the wireless LAN environment according to embodiments of the present invention will be described with reference to FIGS. 3 and 4. Here, the same constructions as those of FIGS. 1 to 3 use the same reference numerals for the convenience of the description.

First, a method of operating the authentication system in the wireless LAN environment according to embodiments of the present invention is described with reference to FIG. 3.

When the terminal device 100 first shifts and accesses the wireless LAN access point while receiving the wireless LAN service, the terminal device 100 transmits an authentication request to the wireless LAN access point 200 to which the terminal device 100 has moved to access in step S110.

Preferably, when the terminal device 100 moves to access the wireless LAN access point 200 while receiving the wireless LAN service through the wireless LAN access point <Old> which the terminal device 100 has previously accessed, the terminal device 100 transmits an authentication request containing an MAC address of the terminal device 100 and an MAC address of the wireless LAN access point <Old>, which the terminal device 100 has previously accessed, to the wireless LAN access point 200, to which the terminal device 100 has moved to access.

Then, the wireless LAN access point 200 identifies authentication information in step S120.

Preferably, the wireless LAN access point 200 identifies IP information on the wireless LAN access point <Old>, which the terminal device 100 has previously accessed, based on the MAC address of the wireless LAN access point <Old> contained in the authentication request received from the terminal device 100, which has shifted and accessed the wireless LAN access point.

Next, the wireless LAN access point 200 requests authentication information in step S130.

Preferably, the wireless LAN access point 200 accesses the wireless LAN access point <Old> based on the identified IP information and transfers the MAC address of the terminal device 100, so that the authentication information is requested.

Next, the wireless LAN access point 200 acquires the authentication information in step S140.

Preferably, the wireless LAN access point 200 acquires the authentication information on the terminal device 100 mapped into the MAC address, which is included in an authentication information response transferred from the wireless LAN access point <Old> having received the authentication request.

Subsequently, the wireless LAN access point 200 performs an authentication for the terminal device 100 in steps S150 to S170.

Preferably, the wireless LAN access point 200 identifies whether the authentication information response transferred from the wireless LAN access point <Old> contains the MAC address of the terminal device 100. As a result of the identification, when the authentication information response contains the MAC address of the terminal device 100, the wireless LAN access point 200 allows the authentication for the terminal device 100 and transmits an authentication response, that is, the MAC address of the terminal device 100 and the MAC address of the wireless LAN access point 200 to the terminal device 100.

Meanwhile, the wireless LAN access point 200 can perform the authentication for the terminal device 100 through an interworking with the authentication server 300 in steps S150, S180, and S190.

Preferably, the wireless LAN access point 200 identifies whether the authentication information response transferred from the wireless LAN access point <Old> contains the MAC address of the terminal device 100. As a result of the identification, when the authentication information response does not contain the MAC address of the terminal device 100, the wireless LAN access point 200 performs a general authentication processing through an interworking with the authentication server 300 and transmits the authentication response, that is, the MAC address of the terminal device 100 and the MAC address of the wireless LAN access point 200 to the terminal device 100.

Hereinafter, a method of operating the wireless LAN access point 200 according to embodiments of the present invention will be described with reference to FIG. 4.

First, the wireless LAN access point 200 receives the authentication request from the terminal device, which has shifted and accessed the wireless LAN access point, in steps S210 to S220.

Preferably, the initial access unit 210 receives the authentication request containing the MAC address of the terminal device 100 and the MAC address of the wireless LAN access point <Old>, which the terminal device has previously accessed, from the terminal device 100, which has shifted and accessed the wireless LAN access point while receiving the wireless LAN service, and transfers the received authentication request to the authentication unit 220.

Then, the authentication unit 220 identifies authentication information on the wireless LAN access point <Old>.

Preferably, the authentication unit 220 identifies IP information on the wireless LAN access point <Old>, which the terminal device 100 has previously accessed, based on the MAC address of the wireless LAN access point <Old> contained in the authentication request received from the terminal device 100, which has shifted and accessed the wireless LAN access point.

Next, the authentication unit 220 requests authentication information on the terminal device 100 in step S240.

Preferably, the authentication unit 220 accesses the wireless LAN access point <Old> based on the identified IP information and transfers the MAC address of the terminal device 100, so that the authentication information is requested.

Next, the authentication unit 220 acquires the authentication information on the terminal device 100 in step S250.

Preferably, the authentication unit 220 acquires the authentication information on the terminal device 100 mapped into the MAC address, which is included in the authentication information response transferred from the wireless LAN access point <Old> having received the authentication request.

Subsequently, the authentication unit 220 performs the authentication for the terminal device 100 in steps S260 to S280.

Preferably, the authentication unit 220 identifies whether the authentication information response received from the wireless LAN access point <Old> contains the MAC address of the terminal device 100. As a result of the identification, when the authentication information response contains the MAC address of the terminal device 100, the authentication unit 220 allows the authentication for the terminal device 100 and transmits an authentication response, that is, the MAC address of the terminal device 100 and the MAC address of the wireless LAN access point 200 to the terminal device 100.

Meanwhile, the authentication unit 220 can perform the authentication for the terminal device 100 through an interworking with the authentication server 300 in steps S260, S290, and S300.

Preferably, the authentication unit 220 identifies whether the authentication information response transferred from the wireless LAN access point <Old> contains the MAC address of the terminal device 100. As a result of the identification, when the authentication information response does not contain the MAC address of the terminal device 100, the wireless LAN access point 200 performs a general authentication processing through an interworking with the authentication server 300 and transmits the authentication response, that is, the MAC address of the terminal device 100 and the MAC address of the wireless LAN access point 200 to the terminal device 100.

As described above, based on the authentication method in the wireless LAN environment according to embodiments of the present invention, when the terminal device 100 receiving a wireless LAN service has moved to access the wireless LAN access point 200, the wireless LAN access point 200 identifies the wireless LAN access point <Old> which the terminal device 100 has previously accessed based on the authentication request received from the terminal device 100 and performs the authentication for the terminal device 100 based on authentication information of the terminal device 100 pre-stored in the identified wireless LAN access point <Old>. As a result, even when the general authentication processing is not possible because of a generation of an error in the authentication server 300, the authentication for the terminal device 100 is performed through the interworking between wireless LAN access points so that the continuity of the wireless LAN service can be guaranteed.

Meanwhile, the method or steps of the algorithm described in connection with the embodiments of the present invention may be implemented by hardware, a software module executed by a processor, or a combination thereof. The software module may be included in an RAM memory, a flash memory, a ROM memory, an EPROM memory, an EEPROM memory, registers, a hard disc, a removable disc, a CD-ROM, or a technically known different type of storage medium. For example, the storage medium is connected with the processor, and accordingly the processor can read information from the storage medium and record the information in the storage medium. Alternatively, the storage medium may be combined with the processor. The processor or the storage medium may be included in an ASIC. The ASIC may be included in the terminal device. Alternatively, the processor and the storage medium may be included in the terminal device as individual components.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The authentication system and method in the wireless LAN environment according to the present invention have an industrial applicability since the invention surpasses the limit of a conventional technology in that a wireless LAN access point performs an authentication for a terminal device based on the authentication information on the terminal device pre-stored in the wireless LAN access point, which the terminal device has previously accessed, according to an authentication request received from the terminal device without an interworking with an authentication server. As a result, it is considered that the present invention can be clearly implemented in reality as a technology related to the present invention can be utilized and also an apparatus to which the technology is applied has sufficient possibility to come to the market or to be sold on the market.

The invention claimed is:

1. An authentication system in a wireless Local Area Network (LAN) environment, the system comprising:
a first wireless LAN access point configured to
acquire authentication information on a terminal device from an authentication server, and
provide a wireless LAN service to the terminal device accessing the first wireless LAN access point;
the terminal device configured to transmit an authentication request to a second wireless LAN access point when the terminal device moves to access the second wireless LAN access point while receiving the wireless LAN service through the first wireless LAN access point; and
the second wireless LAN access point configured to
identify the first wireless LAN access point based on identification information contained in the authentication request transmitted from the terminal device,
acquire the authentication information on the terminal device from the identified first wireless LAN access point, wherein the authentication information on the terminal device has been acquired by the first wireless LAN access point from the authentication server, and
perform an authentication for the terminal device based on the authentication information acquired from the first wireless LAN access point,
wherein the second wireless LAN access point comprises an initial access unit configured to receive the authentication request from the terminal device, and
wherein the authentication request contains one or more of an MAC address of the terminal device and an MAC address of the first wireless LAN access point, and
wherein the second wireless LAN access point comprises an authentication unit configured to
identify IP information of the first wireless LAN access point based on the MAC address of the first wireless LAN access point contained in the authentication request, and
transfer the MAC address of the terminal device to the first wireless LAN access point based on the identified IP information for requesting the authentication information.

2. A wireless Local Area Network (LAN) access point comprising:
an initial access unit configured to receive an authentication request from a terminal device which has moved to access the wireless LAN access point; and
an authentication unit configured to
identify another wireless LAN access point, which the terminal device has previously accessed, based on identification information contained in the authentication request,
acquire authentication information from the identified another wireless LAN access point, wherein the authentication information on the terminal device has been acquired by the another wireless LAN access point from an authentication server, and
perform an authentication for the terminal device based on the authentication information acquired from the another wireless LAN access point,
wherein the initial access unit is further configured to receive the authentication request from the terminal device, and wherein the authentication request contains one or more of an MAC address of the terminal device and an MAC address of the another wireless LAN access point, and
wherein the authentication unit is further configured to
identify IP information of the another wireless LAN access point based on the MAC address of the another wireless LAN access point contained in the authentication request, and
transfer the MAC address of the terminal device to the another wireless LAN access point based on the identified IP information for requesting the authentication information.

3. The wireless LAN access point as claimed in claim 2, wherein the authentication unit is further configured to approve the authentication for the terminal device when the authentication contains the MAC address of the terminal device.

4. The wireless LAN access point as claimed in claim 2, wherein the authentication unit is further configured to perform the authentication for the terminal device by interworking with the authentication server when the authentication information does not contain the MAC address of the terminal device.

5. An authentication method in a wireless Local Area Network (LAN) environment, the method comprising:
providing, by a first wireless LAN access point, a wireless LAN service to a terminal device accessing the first wireless LAN access point;
acquiring, by the first wireless LAN access point, authentication information on the terminal device from an authentication server;
requesting, by the terminal device, an authentication by transmitting an authentication request to a second wireless LAN access point when the terminal device moves to access the second wireless LAN access point while receiving the wireless LAN service through the first wireless LAN access point;
identifying, by the second wireless LAN access point, the first wireless LAN access point based on identification information contained in the authentication request transmitted from the terminal device;
acquiring, by the second wireless LAN access point, the authentication information on the terminal device from the identified first wireless LAN access point, wherein the authentication information on the terminal device has been acquired by the first wireless LAN access point from the authentication server; and
performing, by the second wireless LAN access point, the authentication for the terminal device based on the authentication information acquired from the first wireless LAN access point,
wherein the identifying comprises receiving the authentication request containing one or more of an MAC address of the terminal device and an MAC address of the first wireless LAN access point from the terminal device, and
wherein the acquiring comprises:
identifying Internet Protocol (IP) information of the first wireless LAN access point based on the MAC address of the first wireless LAN access point contained in the authentication request; and
requesting the authentication information by transmitting the MAC address of the terminal device to the first wireless LAN access point based on the identified IP information.

6. The method as claimed in claim 5, wherein the acquiring, by the second wireless LAN access point, the authentication information on the terminal device is performed after identifying the first wireless LAN access point and before performing the authentication for the terminal device.

7. A method of operating a wireless Local Area Network (LAN) access point, the method comprising:
   receiving an authentication request from a terminal device;
   identifying another wireless LAN access point, which the terminal device has previously accessed, based on identification information contained in the authentication request;
   acquiring authentication information on the terminal device from the identified another wireless LAN access point, wherein the authentication information on the terminal device has been acquired by the another wireless LAN access point from an authentication server; and
   performing an authentication for the terminal device based on the authentication information acquired from the another wireless LAN access point,
   wherein the receiving comprises receiving the authentication request containing one or more of an MAC address of the terminal device and an MAC address of the another wireless LAN access point from the terminal device, and
   wherein the acquiring comprises:
      identifying Internet Protocol (IP) information of the another wireless LAN access point based on the MAC address of the another wireless LAN access point contained in the authentication request; and
      requesting the authentication information by transmitting the MAC address of the terminal device to the another wireless LAN access point based on the identified IP information.

8. The method as claimed in claim 7, wherein the performing comprises approving the authentication for the terminal device when the authentication information contains the MAC address of the terminal device.

9. The method as claimed in claim 7, wherein the performing comprises performing the authentication for the terminal device by interworking with the authentication server when the authentication information does not contain the MAC address of the terminal device.

10. The method as claimed in claim 7, wherein the acquiring the authentication information is performed after identifying the another wireless LAN access point and before performing the authentication for the terminal device.

* * * * *